United States Patent Office 3,056,784
Patented Oct. 2, 1962

3,056,784
SUBSTITUTED 5,6-DIHYDRO-2(1H)-PYRAZINONES
Albert A. Carr, Jr., Charles H. Tilford, and William L. Kuhn, Cincinnati, Ohio, assignors to Richardson-Merrell, Inc., New York, N.Y., a corporation of Delaware
No Drawing. Filed Oct. 3, 1960, Ser. No. 59,825
11 Claims. (Cl. 260—250)

This invention relates to new chemical compounds which possess useful physiological and other valuable properties and to a new process of preparing these compounds.

The new compounds of the present invention are 5,6-dihydro-2(IH)-pyrazinones of the formula:

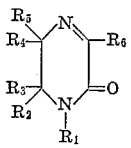

where $R_1$ to $R_5$ may be hydrogen, methyl, phenyl, or phenethyl and $R_3$ and $R_4$ may be joined to form a tetramethylene moiety and $R_6$ may be methyl, phenyl, halophenyl, trifluoromethylphenyl, lower-alkylphenyl, methoxyphenyl, hydroxymethoxyphenyl, dialkylaminophenyl, naphthyl, thienyl, indolyl or pyridyl.

The novel dihydropyrazinones may be obtained by condensing suitably substituted ethylenediamines with an alpha-keto ester in an alcoholic or hydrocarbon solvent according to the reaction:

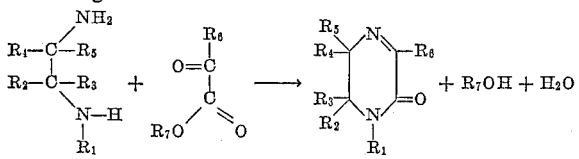

where $R_1$ to $R_6$ are the same as above and $R_7$ is a lower alkyl group. The required ethylenediamines are for the most part commercially available. α,α,β,β-tetramethylethylenediamine was prepared by the method of Sayre, J. Am. Chem. Soc., 77, 6689 (1955). α-Phenylethylenediamine was prepared by the method of Reihlen et al., Ann., 493, 20 (1932).

The alpha-keto esters are commercially available except for the following. Ethyl p-dimethylaminophenylglyoxylate was prepared by the method of Guyot, Compt. rend., 144, 1120 (1907). Methyl 3-indolylglyoxylate was prepared by the method of Shaw et al., J. Org. Chem., 23, 1171 (1958). Ethyl 3,4-dimethoxyphenylglyoxylate was prepared by the method of Kindler et al., Chem. Ber., 76B, 308 (1943). Ethyl 4-hydroxy-2-methoxyphenylglyoxylate was prepared according to the method of Hargreaves et al., J. Appl. Chem., 8, 273 (1958). The remaining α-keto esters were prepared by the reaction of aryl magnesium halides with excess ethyl oxalate.

The condensation of keto esters with ethylenediamines was carried out in hydrocarbon or alcoholic solvents as indicated in the examples. The reaction may occur stepwise according to the equation:

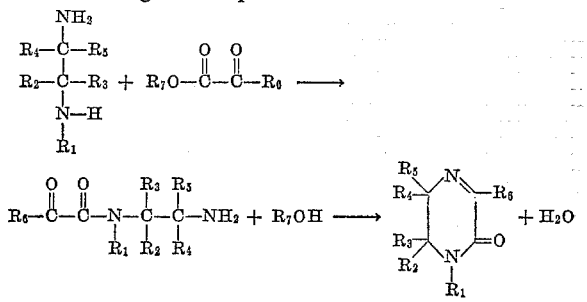

A number of the intermediate β-aminoethyl glyoxylamides have been isolated and appear to be new compounds. They can be used as intermediates in the preparation of the dihydropyrazinones by heating in an appropriate solvent. The conversion of N-β-aminotetramethylethyle m-tr-i-fluoromethylphenylglyoxylamide to 3-(m-trifluoromethylphenyl)-5,5,6,6-tetramethyl-5,6-dihydro - 2(1H) - pyrazinone is illustrated in Example 50.

Although it is not necessary to isolate the glyoxylamides from the reaction mixture a number were isolated from it, all being less soluble than the corresponding pyrazinones in the solvents used. These are shown in Examples 49, 50 and 51.

Compounds in which the $R_1$ group is a group other than hydrogen may also be prepared by alkylation of $N_4$-unsubstituted compounds (where $R_1$=H) by the use of the usual alkylating agents such as dimethyl sulfate in the presence of sodium hydride in hydrocarbon solvents. Such reactions are best carried out in an atmosphere of nitrogen.

The physiological properties of these pyrazinones make them useful as analgesics. As such they may be used for the reduction of pain associated with rheumatoid arthritis, neuralgia, bursitis, myalgia and headaches. The novel dihydropyrazinones are basic and may be used in the form of the free base or their acid addition salts. The compounds may be administered orally in forms such as capsules, tables or elixirs, in dosage ranges of 10 mg. to 4.0 g. daily or parenterally in dosage ranges of 10 mg. to 1 g. daily, depending upon the condition being treated and the compound selected. The preferred route of administration is oral.

The invention is illustrated by the following examples.

General cyclization procedure: An equimolar mixture of the substituted keto ester and the appropriate ethylenediamine in a volume of solvent equal in ml. to about fifteen to thirty times the weight of the keto ester in grams is refluxed for a period of time ranging from about three hours to about seventy-two hours. The solvent is removed partially or completely and the crude product is isolated and recrystallized from ethanol, isopropyl alcohol or hydrocarbon solvents. The hydrochloride salts were prepared by adding an equivalent of alcoholic hydrogen chloride to an ethanol solution of the base, and recrystallizing the product from ethanol.

The preparation of a number of dihydro-2(1H)-pyrazinones will now be illustrated.

EXAMPLE 1

*3-Phenyl-5,6-Dihydro-2(1H)-Pyrazinone Hydrochloride*

A solution of 20.0 g. of ethyl phenylglyoxylate and 7.7 ml. of ethylenediamine in 360 ml. of absolute ethanol was refluxed for 24 hours. The resulting solution volume was reduced by one half on the steam bath and an equal volume of petroleum ether was added. The solution stood over-night, during which time light wellow crystals were deposited. Recrystallization from ethanol-petroleum ether gave 16.4 g. of colorless 3-phenyl-5,6-dihydro-2(1H)-pyrazinone, melting at 141°–142° C.

Conversion of 3-phenyl-5,6-dihydro-2(1H)-pyrazinone to the hydrochloride by alcoholic hydrogen chloride gave 7.8 g. of 3-phenyl-5,6-dihydro-2(1H)-pyrazinone hydrochloride, melting at 254°–258° C.

EXAMPLE 2

*5-Methyl(and/or 6-Methyl)-3-Phenyl-5,6-Dihydro-2(1H)-Pyrazinone*

A solution of 10.0 g. of ethyl phenylglyoxylate and 4.1 g. of 1,2-diaminopropane in 200 ml. of absolute ethanol treated as in Example 1 gave 6.5 g. of 5-methyl-(and/or 6-methyl)-2-phenyl-3,4,5,6-tetrahydro-3-pyrazinone, melting at 120–128° C. after recrystallizing from petroleum ether.

EXAMPLE 3

3-Methyl-5,6-Dihydro-2(1H)-Pyrazinone

A solution of 15.0 g. of ethyl pyruvate and 7.8 g. of ethylenediamine in 200 ml. of absolute ethanol was refluxed for 22 hours. The solvent was removed on the steam bath and the resulting oil extracted with five 100 ml. portions of petroleum ether. The petroleum ether was concentrated, treated with charcoal, and cooled to give 1.4 g. of 3-methyl-5,6-dihydro-2(1H)-pyrazinone, melting at 98°–100° C.

EXAMPLE 4

3,5,5,6,6-Pentamethyl-5,6-Dihydro-2(1H)-Pyrazinone

A solution of 11.6 g. of ethyl pyruvate and 11.6 g. of 1,1,2,2-tetramethylethylenediamine in 260 ml. of absolute ethanol was refluxed for 24 hours. After the solvent was removed on the steam bath, the resulting oil was extracted with hexane, concentrated and cooled to give, after two more recrystallizations from hexane, 2.6 g. of 3,5,5,6,6 - pentamethyl - 5,6 - dihydro-2(1H)-pyrazinone, melting at 131°–132° C.

EXAMPLE 5

3-(p-Dimethylaminophenyl)-5,6-Dihydro-2(1H)-Pyrazinone

A solution of 19.7 g. of ethyl p-dimethylaminophenylglyoxylate and 6.0 g. of ethylenediamine in 300 ml. of absolute ethanol was refluxed for 27 hours and let stand over-night. The precipitate was collected and recrystallized from ethanol (charcoal) to give 10.9 g. of 3-(p-dimethylaminophenyl)-5,6-dihydro - 2(1H) - pyrazinone, melting at 187°–188° C. with decomposition.

EXAMPLE 6

5,5 - Dimethyl(and/or 6,6-Dimethyl)-3-Phenyl-5,6-Dihydro-2(1H)-Pyrazinone Hydrochloride A solution of 4.4 g. of 1,1-dimethylethylenediamine and 8.9 g. of ethyl phenylglyoxylate in 150 ml. of absolute ethanol was refluxed for 24 hours. The ethanol solution was evaporated to half-volume and cooled. The resulting precipitate was recrystallized from absolute ethanol to give 7.2 g. of 5,5-dimethyl(and/or 6,6-dimethyl)-3-phenyl-5,6-dihydro-2(1H)-pyrazinone, melting at 124.5°–125.5° C.

Treatment of this material with alcoholic hydrogen chloride gave 4.0 g. of 5,5-dimethyl(and/or 6,6-dimethyl)-3-phenyl-5,6-dihydro - 2(1H) - pyrazinone hydrochloride, melting at 226°–230° C.

EXAMPLE 7

3 - Phenyl-5,5,6,6-Tetramethyl-5,6-Dihydro-2(1H)-Pyrazinone

A solution of 7.2 g. of ethyl phenylglyoxylate and 4.6 g. of 1,1,2,2-tetramethylethylenediamine in 100 ml. of n-butanol was refluxed for 72 hours. The solvent was removed and the residue triturated with petroleum ether and recrystallized from absolute ethanol to give 1.0 g. of 3-phenyl-5,5,6,6-tetramethyl-5,6-dihydro - 2(1H) - pyrazinone, melting at 168°–169° C.

Similarly, a large number of other substituted dihydro-2(1H)-pyrazinones were prepared according to the general cyclization procedure and under conditions shown in the following table:

TABLE
[$R_1$=H throughout]

| Example | $R_2$ | $R_3$ | $R_4$ | $R_5$ | $R_6$ | Reaction solvent | Reflux time, hrs. | Isolated form | M.P., °C. | Yield, percent |
|---|---|---|---|---|---|---|---|---|---|---|
| 8 | H | $CH_3$ | $CH_3$ | H | $C_6H_5$ | Iso-PrOH | 24 | Base | 112 – 15 | 44 |
| 9 | H | —$(CH_2)_4$— | | H | $C_6H_5$ | EtOH | 24 | do | 173 – 5 | 39 |
| 10[1] | H | $C_6H_5$ | H | H | $C_6H_5$ | EtOH | 24 | do | 187 – 95 | 19 |
| 11 | H | H | H | H | p-$ClC_6H_4$ | EtOH | 20 | do | 142 – 3 | 29 |
| 12[1] | H | $CH_3$ | H | H | p-$ClC_6H_4$ | EtOH | 20 | do | 86 – 90 | 39 |
| 13 | H | $CH_3$ | $CH_3$ | H | p-$ClC_6H_4$ | Iso-PrOH | 24 | do | 150 – 3 | 41 |
| 14[1] | $CH_3$ | $CH_3$ | H | H | p-$ClC_6H_4$ | Iso-PrOH | 24 | do | 115 – 19 | 40 |
| 15 | $CH_3$ | $CH_3$ | $CH_3$ | $CH_3$ | p-$ClC_6H_4$ | n-BuOH | 24 | do | 167 – 8 | 11 |
| 16 | H | H | H | H | p-$FC_6H_4$ | EtOH | 24 | do | 132 – 4 | 16 |
| 17[1] | H | $CH_3$ | H | H | p-$FC_6H_4$ | EtOH | 24 | do | 88 – 90 | 52 |
| 18 | H | $CH_3$ | $CH_3$ | H | p-$FC_6H_4$ | EtOH | 24 | do | 106 – 10 | 43 |
| 19[1] | $CH_3$ | $CH_3$ | H | H | p-$FC_6H_4$ | EtOH | 24 | do | 125 – 7.5 | 58 |
| 20 | $CH_3$ | $CH_3$ | $CH_3$ | $CH_3$ | p-$FC_6H_4$ | n-BuOH | 24 | do | 168 – 70 | 8 |
| 21 | H | H | H | H | p-$CF_3C_6H_4$ | EtOH | 24 | do | 129 – 32 | 26 |
| 22[1] | H | $CH_3$ | H | H | p-$CF_3C_6H_4$ | EtOH | 24 | do | 197 – 8 | 19 |
| 23 | H | $CH_3$ | $CH_3$ | H | p-$CF_3C_6H_4$ | EtOH | 24 | do | 150 – 3 | 63 |
| 24[1] | $CH_3$ | $CH_3$ | H | H | p-$CF_3C_6H_4$ | EtOH | 24 | do | 113 – 16 | 65 |
| 25 | H | —$(CH_2)_4$— | | H | p-$CF_3C_6H_4$ | EtOH | 24 | do | 184 – 8 | 31 |
| 26 | H | H | H | H | m-$CF_3C_6H_4$ | EtOH | 24 | do | 112 – 15 | 46 |
| 27[1] | H | $CH_3$ | H | H | m-$CF_3C_6H_4$ | EtOH | 24 | do | 90 –120 | 13 |
| 28 | H | $CH_3$ | $CH_3$ | H | m-$CF_3C_6H_4$ | EtOH | 24 | do | 150 – 3 | 18 |
| 29[1] | $CH_3$ | $CH_3$ | H | H | m-$CF_3C_6H_4$ | EtOH | 24 | do | 113 – 15 | 31 |
| 30 | $CH_3$ | $CH_3$ | $CH_3$ | $CH_3$ | m-$CF_3C_6H_4$ | n-BuOH | 24 | do | 115 – 18 | 19 |
| 31 | H | H | H | H | p-$CH_3OC_6H_4$ | EtOH | 24 | do | 114 – 16 | 28 |
| 32 | H | $CH_3$ | H | H | 3,4-$(CH_3O)_2C_6H_3$ | EtOH | 24 | do | 146 – 8 | 10 |
| 33[1] | H | $CH_3$ | H | H | 3,4-$(CH_3O)_2C_6H_3$ | EtOH | 20 | do | 119 – 21.5 | 8 |
| 34 | H | H | H | H | 2-$CH_3O$-4-$OHC_6H_3$ | Iso-PrOH | 24 | do | 218 | 60 |
| 35 | H | H | H | H | p-$CH_3C_6H_4$ | Iso-PrOH | 22 | do | 161.5– 3 | 11 |
| 36[1] | H | $CH_3$ | H | H | p-$CH_3C_6H_4$ | Iso-PrOH | 24 | do | 97 –127 | 0.3 |
| 37 | H | H | H | H | α-Naphthyl | EtOH | 24 | do | 154 – 6 | 55 |
| 38[1] | H | $CH_3$ | H | H | do | EtOH | 24 | do | 132 – 5 | 31 |
| 39 | H | $CH_3$ | $CH_3$ | H | do | EtOH | 24 | do | 149 – 51 | 40 |
| 40[1] | $CH_3$ | $CH_3$ | H | H | do | EtOH | 24 | do | 230 – 33 | 32 |
| 41 | H | —$(CH_2)_4$— | | H | do | EtOH | 24 | do | 162 – 5 | 16 |
| 42 | H | H | H | H | 2-thienyl | EtOH | 24 | do | 139 – 40.5 | 14 |
| 43[1] | H | $CH_3$ | H | H | do | Iso-PrOH | 3.5 | do | 117 – 22 | 41 |
| 44 | H | $CH_3$ | $CH_3$ | H | do | Iso-PrOH | 24 | do | 155 – 6.5 | 18 |
| 45 | H | H | H | H | 3-indolyl | EtOH | 24 | HCl | 279 – 81 | 85 |
| 46 | H | H | H | H | 2-pyridyl | EtOH | 24 | Base | 150 – 1 | 2 |

[1] These compounds may be a mixture of isomers. When using C-substituted unsymmetrical ethylenediamines, the ring closure may occur in either of two directions, giving rise to 5- (or 6-)-monosubstituted or to 5,5- (or 6,6-)-disubstituted compounds. These could not be readily separated, but in some cases the wide melting range indicated the presence of a mixture of isomers.

EXAMPLE 47

*1-Methyl-3-Phenyl-5,6-Dihydro-2(1H)-Pyrazinone*

Refluxing an equimolar solution of N-methylethylenediamine and ethyl phenylglyoxylate in ethanol for 24 hours, as in the general cyclization procedure, gives a yield of 2.5 g. of the product, 1-methyl-3-phenyl-5,6-dihydro-2(1H)-pyrazinone, M.P. 61°–62° C., purified by elution from an alumina column with benzene.

The same product is prepared in better yield by alkylating 3-phenyl-5,6-dihydro-2(1H)-pyrazinone. A mixture of 38 g. of 2-phenyl-3,4,5,6-tetrahydro-3-pyrazinone and 10.5 g. of a 50 percent sodium hydride suspension is stirred in 600 ml. of anhydrous benzene, in a nitrogen atmosphere, and heated to reflux for 19 hours. Then 27.5 g. of dimethyl sulfate in 50 ml. of dry benzene is added and the mixture is refluxed for an additional 6 hours. The reaction mixture is cooled, filtered, and the solvent is removed from the filtrate under vacuum. The oily residue is extracted with petroleum ether (B.P. 70°–90° C.) and the extract is decolorized by treatment with charcoal or activated alumina. Upon cooling, crystals of 1-methyl-3-phenyl-5,6-dihydro-2(1H)-pyrazinone precipitate; yield, 14 g., M.P. 60°–63° C. This product represents a yield of 36 percent and is analytically pure.

EXAMPLE 48

*1,5,5-(or 1,6,6-)-Trimethyl-3-Phenyl-5,6-Dihydro-2(1H)-Pyrazinone*

Using the alkylation procedure in Example 47, 15 g. of 5,5-(or 6,6-)-dimethyl-3-phenyl-5,6-dihydro-2(1H)-pyrazinone, 3.5 g. of 50 percent sodium hydride suspension and 9.3 g. of dimethyl sulfate yield 6.9 g. (43 percent) of either 1,5,5-(or 1,6,6-)-trimethyl-3-phenyl-5,6-dihydro-2(1H)-pyrazinone, M.P. 42°–46° C. or a mixture thereof.

EXAMPLE 49

*N-(2-Aminotetramethylethyl) Phenylglyoxylamide*

A solution of 17.8 g. of ethyl phenylglyoxylate and 11.6 g. of α,α,β,β-tetramethylethylenediamine in 150 ml. of ethanol was refluxed for 27 hours. The solvent was removed in vacuo and the residue was recrystallized from a mixture of ethanol and petroleum ether to give 4.0 g. (14 percent yield) of N-(2-aminotetramethylethylphenylglyoxylamide, M.P. 186°–187° C.

When butanol is used as the solvent in this reaction, the cyclized product of Example 7 results.

EXAMPLE 50

*N-(2-Aminotetramethylethyl)-m-Trifluoromethylphenylglyoxylamide*

Using the procedure of Example 49, 10.0 g. of ethyl m-trifluoromethylphenylglyoxylate and 4.7 g. of α,α,β,β-tetramethylethylenediamine in ethanol gives 1.2 g. of N-(2-aminotetramethylethyl) - m - trifluoromethylphenylglyoxylamide, M.P. 189°–190° C.

When butanol is used as the solvent, the cyclized product of Example 30 results, or upon refluxing 0.8 g. of this intermediate in 100 ml. of butanol for 8 hours there results a 10 percent yield of the cyclized product of Example 30, 5,5,6,6-tetramethyl-3-(m-trifluoromethylphenyl)-5,6-dihydro-2(1H)-pyrazinone, melting point 115°–118° C.

EXAMPLE 51

*N-(2-Aminotetramethylethyl) Pyruvamide*

In the preparation of 3,5,5,6,6-pentamethyl-5,6-dihydro-2(1H)-pyrazinone, Example 4, the crude product was recrystallized from hexane. However, a considerable amount of hexane-insoluble material was obtained and recrystallization of this hexane-insoluble fraction from a mixture of benzene and methanol gave the intermediate, N-(2-aminotetramethylethyl)pyruvamide, melting point 205° C. (with decomposition).

We claim:

1. Compounds of the group consisting of those having the formula:

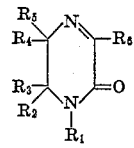

in which $R_1$, $R_2$, $R_3$, $R_4$ and $R_5$ are selected from the group consisting of hydrogen, lower alkyl, phenyl, phenethyl and $R_3$ and $R_4$ may together form the tetramethylene moiety and $R_6$ is selected from the group consisting of lower alkyl, phenyl, halophenyl, trifluoromethylphenyl, lower alkylphenyl, lower alkoxyphenyl, hydroxymethoxyphenyl, dialkylaminophenyl, naphthyl, thienyl, indolyl and pyridyl.

2. A method of preparing compounds having the formula:

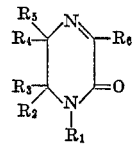

in which $R_1$, $R_2$, $R_3$, $R_4$ and $R_5$ are selected from the group consisting of hydrogen, lower alkyl, phenyl, phenethyl and $R_3$ and $R_4$ may together form the tetramethylene moiety and $R_6$ is selected from the group consisting of lower alkyl, phenyl, halophenyl, trifluoromethylphenyl, lower alkylphenyl, lower alkoxyphenyl, hydroxymethoxyphenyl, dialkylaminophenyl, naphthyl, thienyl, indolyl and pyridyl, which comprises condensing an ethylene diamine of the formula: $NHR_1CR_2R_3CR_4R_5NH_2$ with an α-keto ester of the formula:

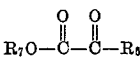

in which $R_1$, $R_2$, $R_3$, $R_4$, $R_5$ and $R_6$ are defined as above and $R_7$ is a lower alkyl radical.

3. 3-phenyl-5,6-dihydro-2(1H)-pyrazinone.
4. 6-methyl-3-phenyl-5,6-dihydro-2(1H)-pyrazinone.
5. 3,5,5,6,6 - pentamethyl - 5,6 - dihydro - 2(1H)-pyrazinone.
6. 1 - methyl - 3 - phenyl-5,6 - dihydro-2(1H)-pyrazinone.
7. 5,5 - dimethyl - 3 - phenyl-5,6-dihydro-2(1H)-pyrazinone.
8. 6 - methyl - 3 - (1 - naphthyl)-5,6-dihydro-2(1H)-pyrazinone.
9. N - (2-aminotetramethylethyl)phenylglyoxylamide.
10. N - 2-aminotetramethylethyl) - m - trifluoromethylphenylglyoxylamide.
11. N-(2-aminotetramethylethyl)pyruvamide.

No references cited.

UNITED STATES PATENT OFFICE
CERTIFICATE OF CORRECTION

Patent No. 3,056,784                  October 2, 1962

Albert A. Carr, Jr., et al.

It is hereby certified that error appears in the above numbered patent requiring correction and that the said Letters Patent should read as corrected below.

Column 2, line 5, for "aminotetramethylethyle m-tr-i-" read -- aminotetramethylethyl m-tri- --; line 28, for "tables" read -- tablets --; line 56, for "wellow" read -- yellow --; line 72, for "6-methyl)-2-phenyl-3,4,5,6-tetrahydro-3-pyrazinor read -- 6-methyl)-3-phenyl-5,6-dihydro-2(1H)-pyrazinone --; columns 3 and 4, in the table, "Example 33" under the column heading "$R_6$" for "3.4" read -- 3,4 --; column 5, line 12, for "2-phenyl-3,4,5,6-tetrahydro-3-pyrazinone" read -- 3-phenyl-5,6-dihydro-2(1H)-pyrazinone --; column 6, line 64, for "N-2-aminotetramethyl-ethyl)" read -- N-(2-aminotetramethyl-ethyl)- --.

Signed and sealed this 10th day of September 1963.

(SEAL)
Attest:

ERNEST W. SWIDER                  DAVID L. LADD
Attesting Officer                 Commissioner of Patents